US012206229B2

(12) United States Patent
Zavrel

(10) Patent No.: US 12,206,229 B2
(45) Date of Patent: Jan. 21, 2025

(54) SPLICE ENCLOSURE FOR CABLE REPAIRS

(71) Applicant: COMMSCOPE TECHNOLOGIES LLC, Hickory, NC (US)

(72) Inventor: Jiri Zavrel, Leuven (BE)

(73) Assignee: Commscope Technologies LLC, Hickory, NC (US)

(*) Notice: Subject to any disclaimer, the term of this patent is extended or adjusted under 35 U.S.C. 154(b) by 238 days.

(21) Appl. No.: 17/782,457

(22) PCT Filed: Dec. 3, 2020

(86) PCT No.: PCT/US2020/063094
§ 371 (c)(1),
(2) Date: Jun. 3, 2022

(87) PCT Pub. No.: WO2021/113502
PCT Pub. Date: Jun. 10, 2021

(65) Prior Publication Data
US 2023/0010410 A1 Jan. 12, 2023

Related U.S. Application Data

(60) Provisional application No. 62/942,922, filed on Dec. 3, 2019.

(51) Int. Cl.
H02G 3/08 (2006.01)
G02B 6/44 (2006.01)
(Continued)

(52) U.S. Cl.
CPC ......... H02G 15/113 (2013.01); G02B 6/4446 (2013.01); H02G 15/007 (2013.01); H02G 15/013 (2013.01); H02G 15/103 (2013.01)

(58) Field of Classification Search
CPC .. H02G 15/103; H02G 15/113; H02G 15/115; H02G 15/013; H02G 15/007;
(Continued)

(56) References Cited

U.S. PATENT DOCUMENTS 5,322,973 A 6/1994 Dagan
6,265,670 B1 * 7/2001 Duesterhoeft ......... H02G 3/083
174/152 G
(Continued)

FOREIGN PATENT DOCUMENTS

KR 10-1029532 B1 4/2011
KR 10-1269276 B1 5/2013
WO 2020/210638 A1 10/2020

OTHER PUBLICATIONS

International Search Report and Written Opinion of the International Searching Authority for International Patent Application No. PCT/US2020/063094 mailed Mar. 15, 2021, 8 pages.

(Continued)

Primary Examiner — Angel R Estrada
(74) Attorney, Agent, or Firm — Merchant & Gould P.C.

(57) ABSTRACT

The present disclosure relates to splice enclosures adapted for providing cable repairs. The splice enclosures can include a bracket arrangement that allows for variable placement of splice modules on platforms of the bracket arrangement. The bracket arrangement can also provide cable anchoring locations.

27 Claims, 13 Drawing Sheets

(51) Int. Cl.
*H02G 15/007* (2006.01)
*H02G 15/013* (2006.01)
*H02G 15/103* (2006.01)
*H02G 15/113* (2006.01)

(58) Field of Classification Search
CPC . H02G 3/08; H02G 3/081; H02G 3/22; G02B 6/4446; G02B 6/4439; G02B 6/444
USPC ...... 174/50, 17 R, 520, 650, 652, 77 R, 559; 385/134, 135; 361/600, 601; 439/76.1, 439/76.2
See application file for complete search history.

(56) References Cited

U.S. PATENT DOCUMENTS

| | | | | |
|---|---|---|---|---|
| 6,944,383 | B1* | 9/2005 | Herzog | G02B 6/4455 439/502 |
| 7,045,710 | B1* | 5/2006 | Allen | H02G 15/076 174/38 |
| 7,728,225 | B2* | 6/2010 | Anderson | H04Q 1/06 312/265.2 |
| 8,005,333 | B2* | 8/2011 | Mullaney | G02B 6/4446 174/50 |
| 8,660,397 | B2* | 2/2014 | Giraud | G02B 6/4441 385/135 |
| 11,719,900 | B2* | 8/2023 | Carapella | H02G 3/083 385/135 |
| 11,726,284 | B2* | 8/2023 | Geens | G02B 6/44465 385/135 |
| 11,789,225 | B2* | 10/2023 | Smrha | G02B 6/444 385/135 |
| 2005/0271344 | A1 | 12/2005 | Grubish et al. | |
| 2006/0280420 | A1 | 12/2006 | Blackwell, Jr. et al. | |
| 2009/0202214 | A1 | 8/2009 | Holmberg et al. | |

OTHER PUBLICATIONS

TRAC(TM) Aerial Closure, Data Sheet, Raychem Corporation, 1-2 (1985).
TRACE(TM)—AA, Toolless Re-enterable Aerial Closure Extension Coupler Kit, Raychem System Practive and Installation Instructions, Raychem Corporation, 1-4 (1987).
AIR FOSC Extension Kit: Installation Instructions, Raychem, System Practive and Installation Instruction, Raychem Corporation, 1-4 (1995).
3M(TM) SLiC(TM) Aerial Closures and Terminals: Protecting your aerial network down to the last mile, 3M Communication Markets Division, 1-16 (2017).
MJC-FOSC Direct Tap-Off Closure with FOSC Splice Trays, CommScope, Inc., 2 pages (Dec. 2015).
MJC Closure Installation Instruction, TC-741-IP, Rev A, 4 pages, CommScope, Inc. (Feb. 2017).

* cited by examiner

SPLICE ENCLOSURE FOR CABLE REPAIRS

CROSS-REFERENCE TO RELATED APPLICATION

This application is a National Stage Application of PCT/US2020/063094, filed on Dec. 3, 2020, which claims the benefit of U.S. Patent Application Ser. No. 62/942,922, filed on Dec. 3, 2019, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers. It is often preferred for the telecommunications enclosures to be re-enterable. The term "re-enterable" means that the telecommunications enclosures can be re-opened to allow access to the telecommunications components housed therein without requiring the removal and destruction of the telecommunications enclosures.

SUMMARY

The present disclosure relates generally to re-enterable telecommunication enclosures. In certain examples, the telecommunication enclosures are splice enclosures. In certain examples, the splice enclosures are adapted for use in providing cable repairs. In certain examples, the splice enclosures can include internal brackets configured to allow optical splices to be mounted at variable mounting positions to accommodate different fiber lengths corresponding to fiber optic cables routed through the enclosure. In certain examples, the brackets can have tray-like or basket-like configurations. In certain examples, the internal brackets can allow for cable anchoring within the enclosure and can include cable anchoring locations. In certain examples, the internal brackets can be adapted to provide shield electrical continuity through the length of the enclosure.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular examples of the present disclosure and therefore do not limit the scope of the present disclosure. Examples of the present disclosure will hereinafter be described in conjunction with the appended drawings, wherein like numerals denote like elements.

DETAILED DESCRIPTION

Figure 1:
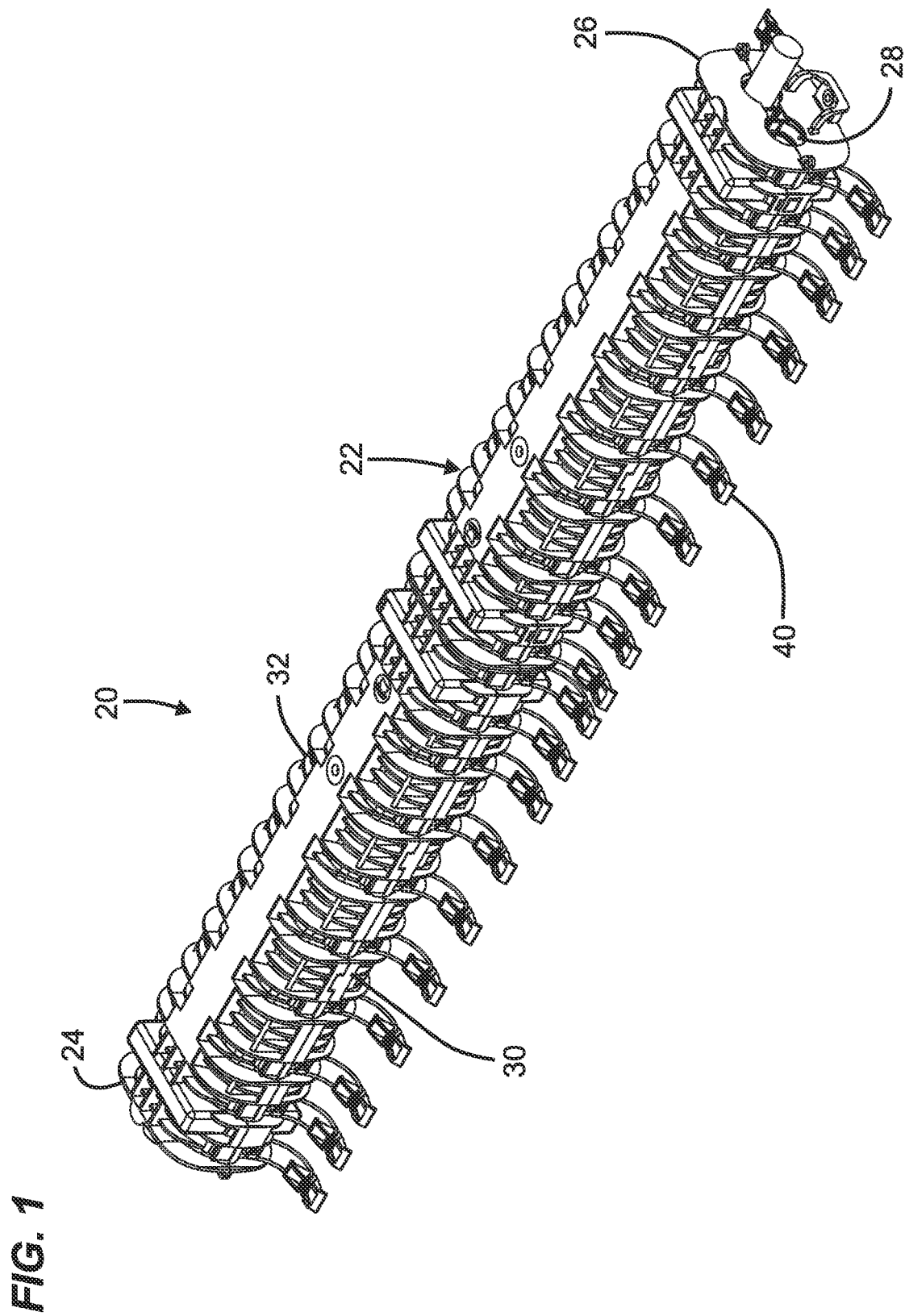
FIG. 1 is a perspective view depicting a telecommunication enclosure in accordance with the principles of the present disclosure.
Figure 2:
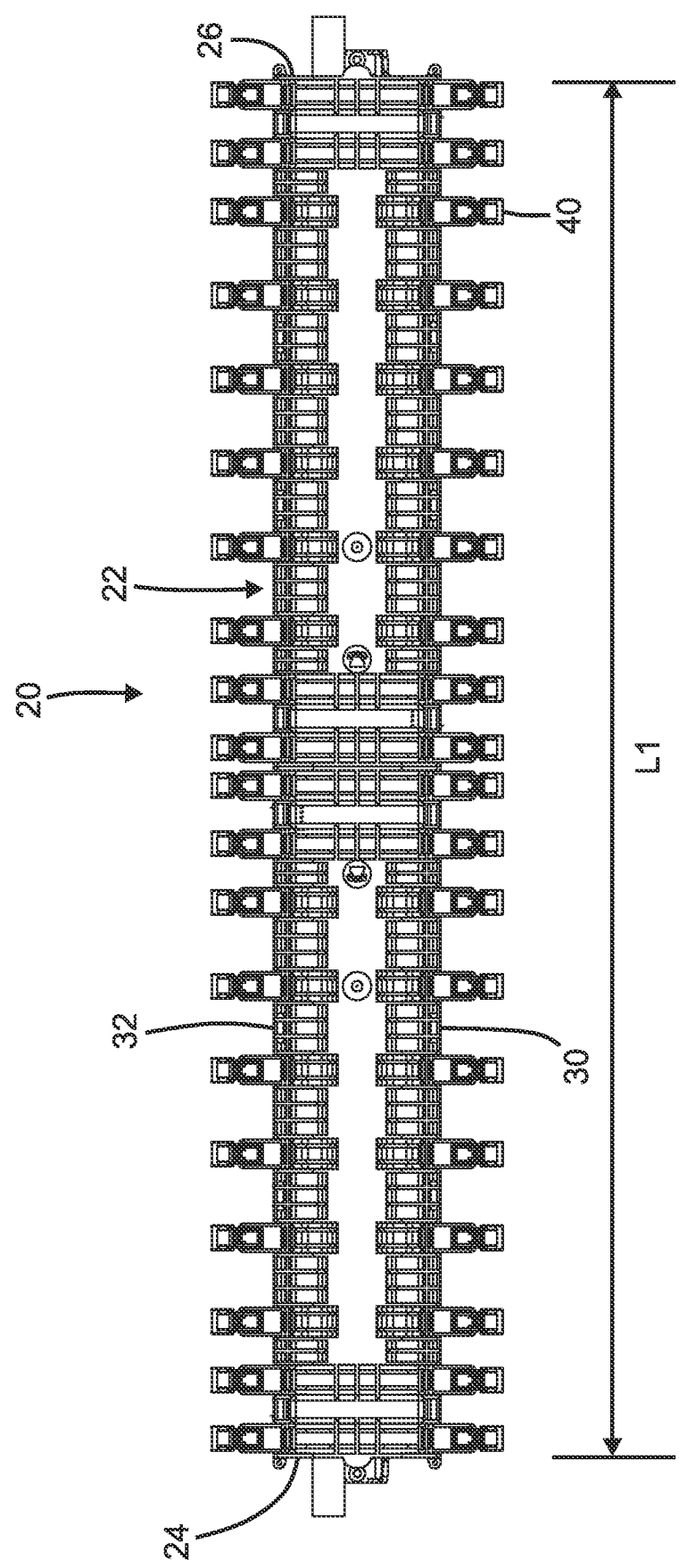
FIG. 2 is a top view of a telecommunication enclosure of FIG. 1.
Figure 3:
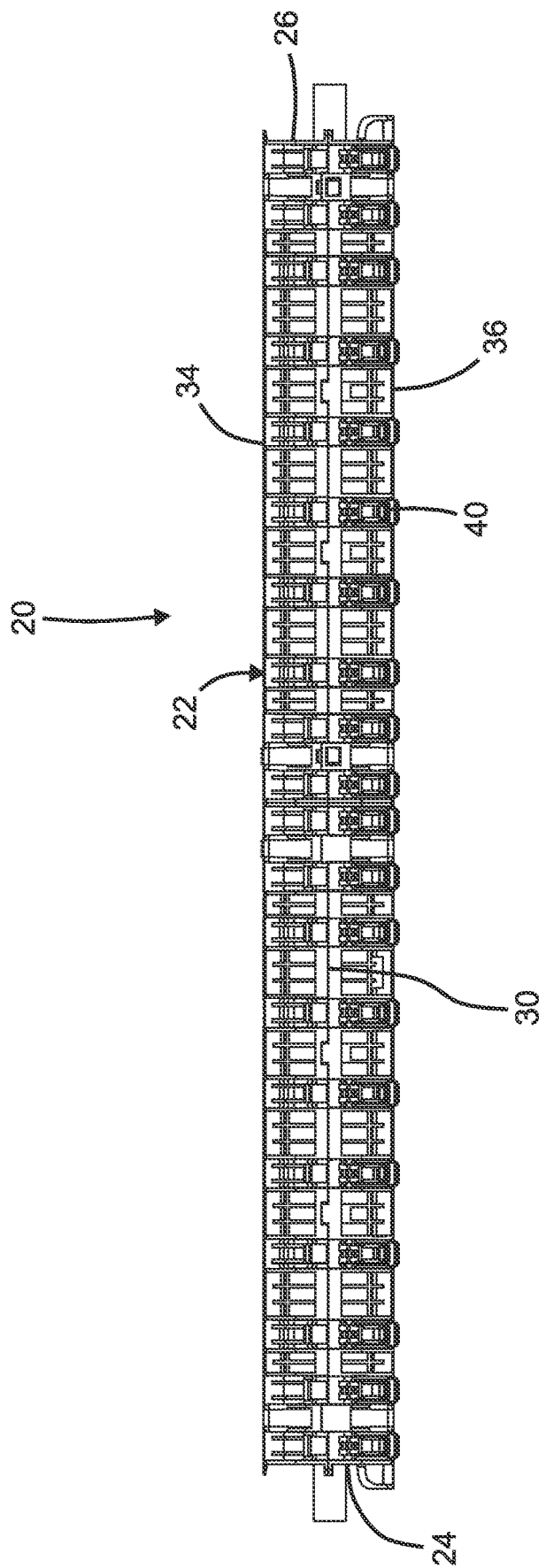
FIG. 3 is a side view of the telecommunication enclosure of FIG. 1.

Various examples will be described in detail with reference to the drawings, wherein like reference numerals represent like parts and assemblies throughout the several views.

Aspects of the present disclosure relate to telecommunication enclosure configurations adapted for facilitating optical splicing between fiber optic cables. In certain examples, optical splicing between optical fibers of optical cables can be used for providing cable repairs, for splicing branch fibers (e.g. drop fibers) to optical fibers of a distribution cable, or the like. In certain examples, the enclosure provides a variety of internal functions such as cable anchoring, maintaining shield continuity between cables connected to opposite ends of the enclosure, fiber management, splice securement, protection and positioning, and other functions. Enclosures in accordance with the principles of the present disclosure preferably are environmentally sealed and re-enterable. In certain examples, enclosures in accordance with the principles of the present disclosure can be used to repair a broken optical fiber of a cable routed through the enclosure by splicing a length of optical fiber between the ends of the broken fiber to provide a bridge across the broken section of the optical fiber.

FIGS. 1-6 depict a telecommunication enclosure 20 in accordance of the principles of the present disclosure. The enclosure 20 includes an elongate housing 22 having a length L1 that extends from a first end 24 to a second end 26. The first and second ends 24, 26 each define cable sealing ports 28 for allowing cables to be routed into an interior 39 of the housing 22. In certain examples, the cable sealing ports 28 include a sealant such as sealing gel for providing sealing around the cables routed into the interior 39 of the housing 22 and for sealing the ends 24, 26 of the housing 22.

The housing 22 also includes first and second opposite sides 30, 32 that extend along the length L1 of the housing 22 between the first and second ends 24, 26. The housing 22 includes first and second housing sections 34, 36 that cooperate to enclose the interior of the housing 22. In the depicted example, the first and second housing sections 34, 36 are housing half sections that each define half of the housing 22 and that each extend from the first end 24 to the second end 26 of the housing 22. The first and second housing sections 34, 36 meet at parallel seal locations 38 positioned at the first and second sides 30, 32 of the housing 22. The parallel seal locations 38 extend along the length L1 of the housing 22 from the first end 24 to the second end 26. The first and second housing sections 34, 36 are separable from one another to allow the interior 39 of the housing 22 to be accessed.

The enclosure 20 also includes a plurality of latches 40 positioned along each of the first and second sides 30, 32 for latching the first and second housing sections 34, 36 together. In certain examples, latches 40 can bias and clamp the first and second housing sections 34, 36 together and can compress the seal locations 38 to ensure effective sealing between the housing sections 34, 36.

In certain examples, the first housing section 34 and the second housing 36 can each have a plastic construction can be molded as a single unitary piece. In other examples, the first housing section 34 and the second housing section 36 can each be formed by a plurality of housing pieces secured (e.g. welded) together. In the depicted example, the first housing section 34 is formed by housing pieces 34A, 34B that are welded together end-to-end, and the second housing section 36 is formed by housing pieces 36A, 36B that are welded together end-to-end.

Figure 4:
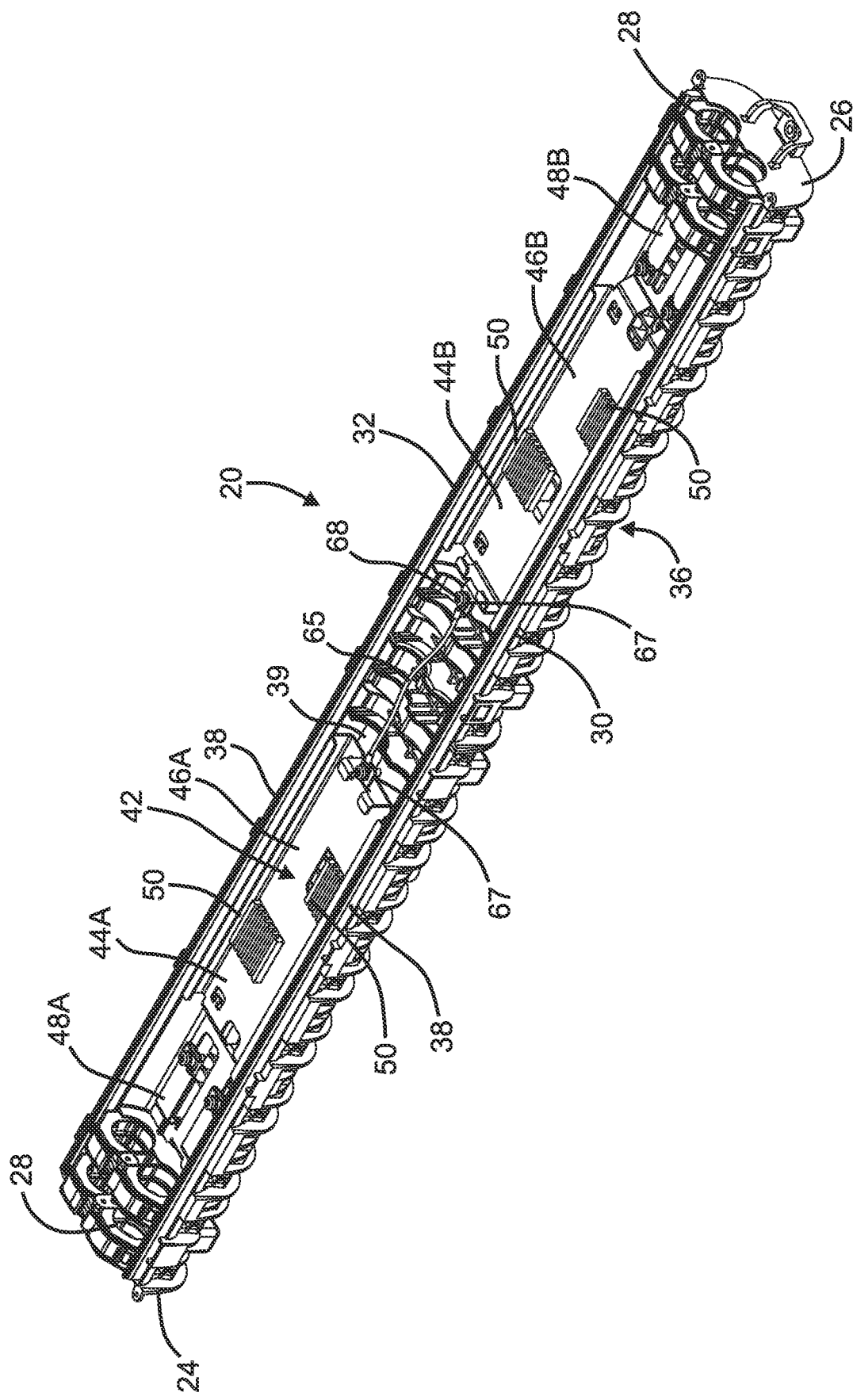
FIG. 4 is a perspective view of the telecommunication enclosure of FIG. 1 with a first section of a housing of the enclosure removed such that an internal bracket arrangement of the enclosure is visible.
Figure 5:
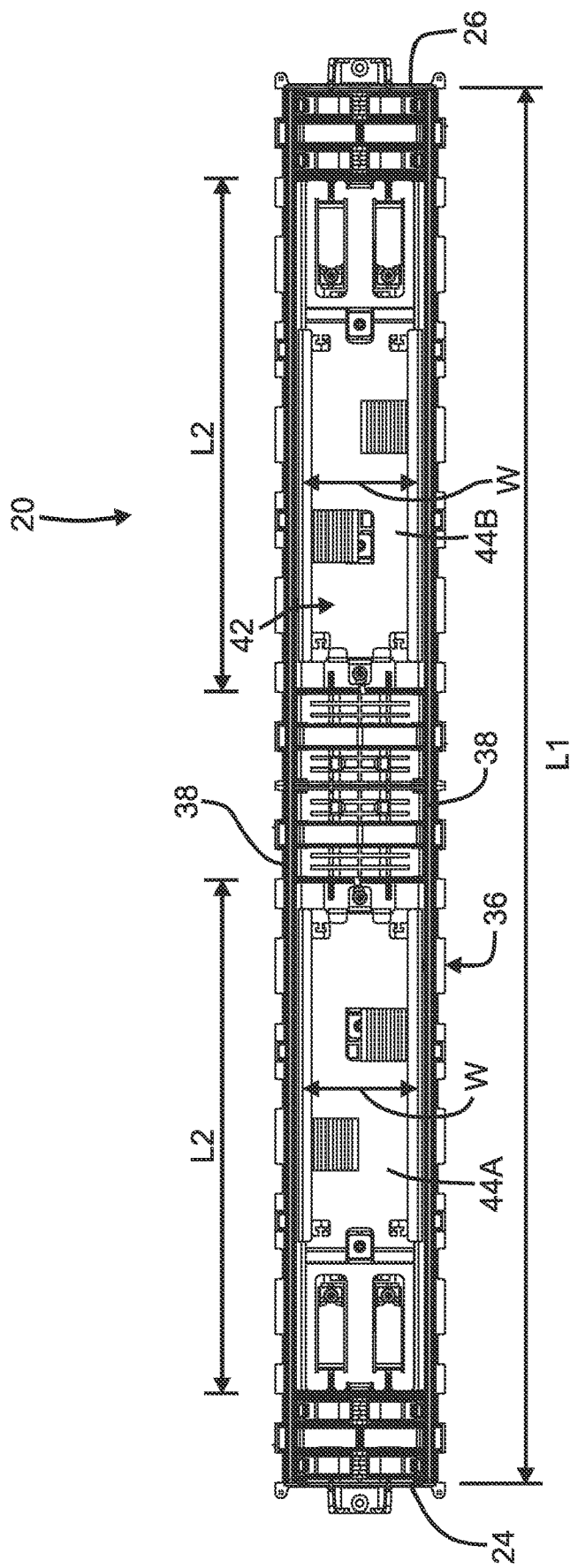
FIG. 5 is a top view of the internal bracket arrangement of FIG. 4.
Figure 6:
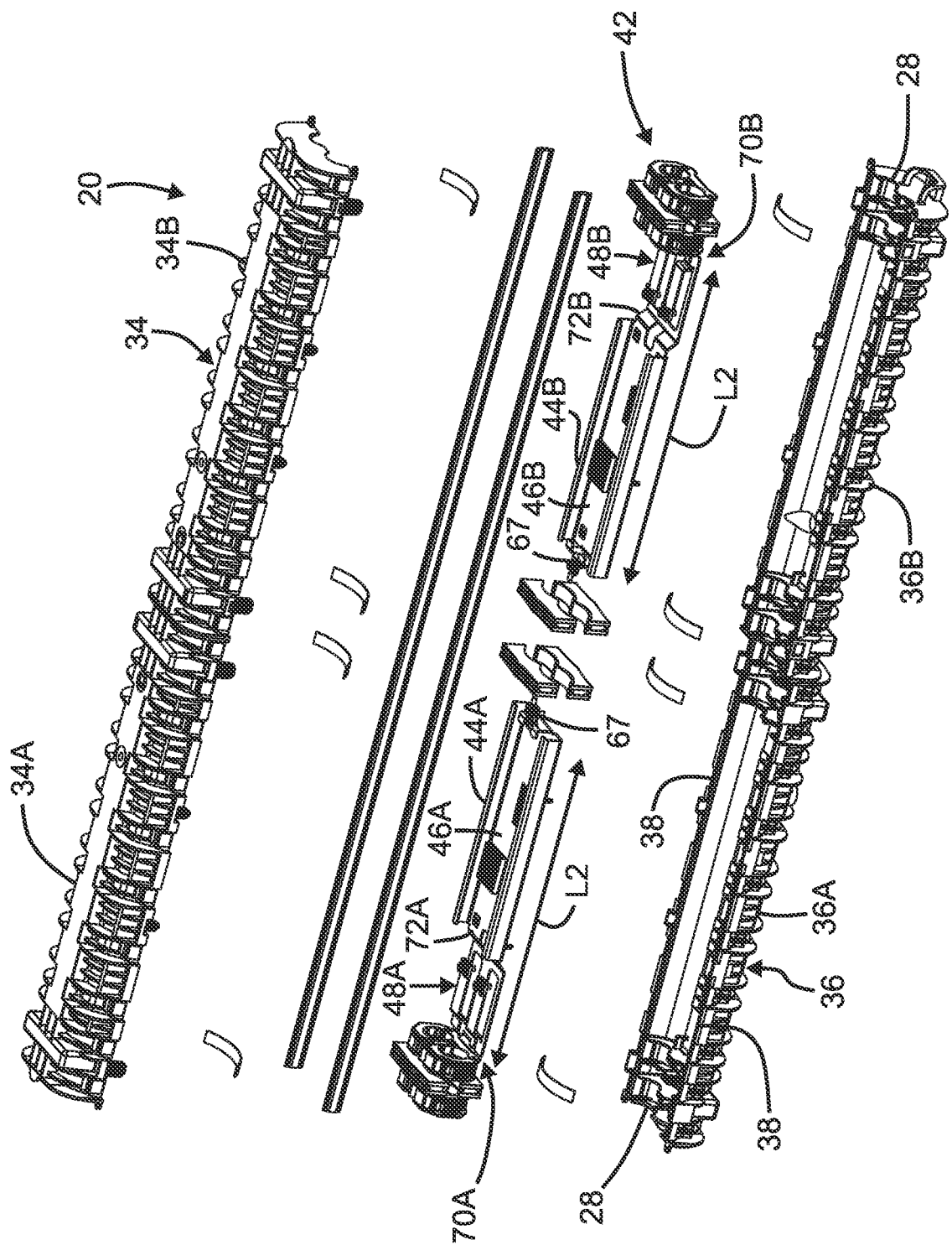
FIG. 6 is an exploded view of the telecommunication enclosure of FIG. 1.
Figure 9:
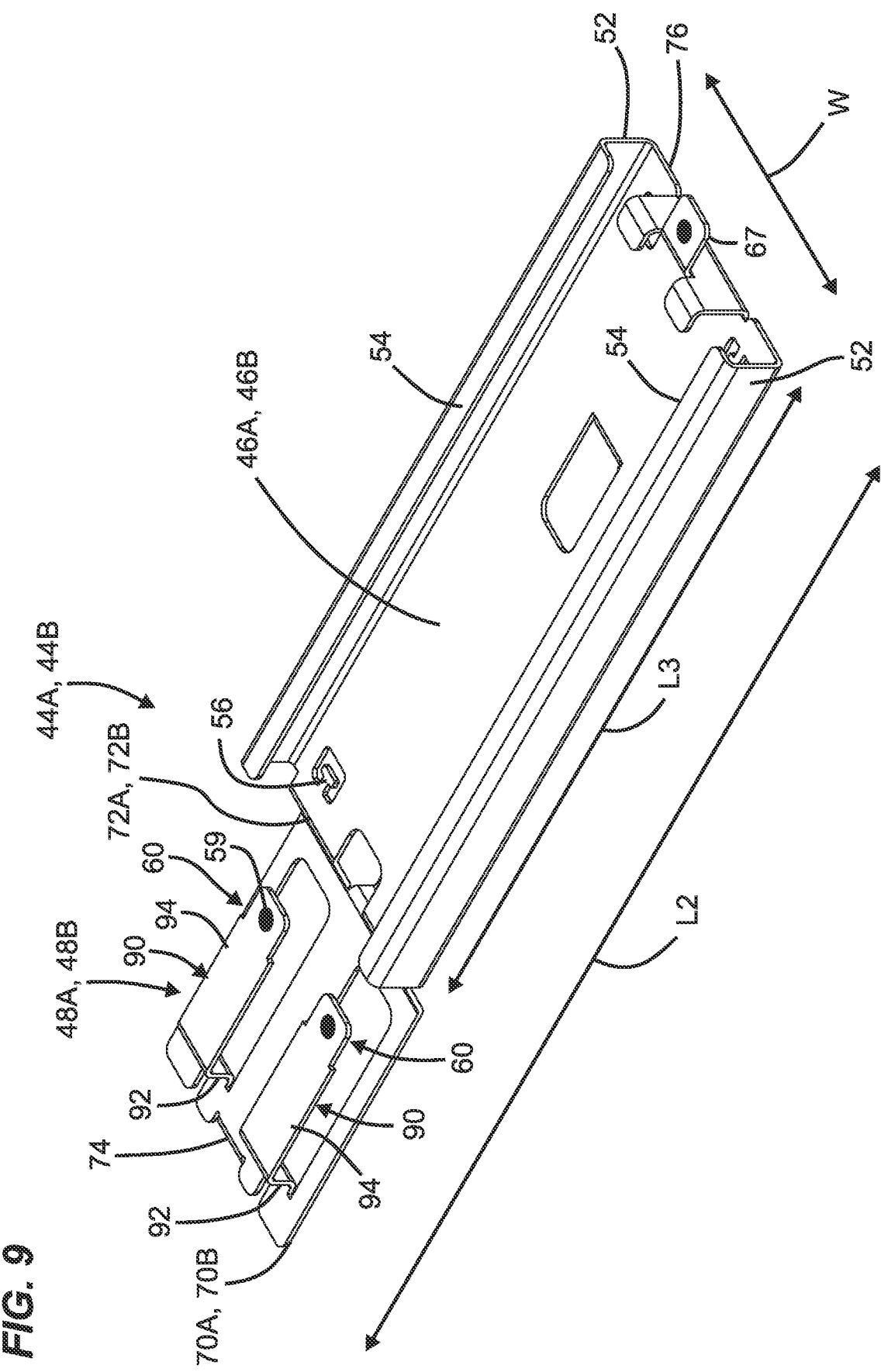
FIG. 9 is a top, perspective view of one of the internal brackets of the enclosure of FIG. 1.
Figure 10:
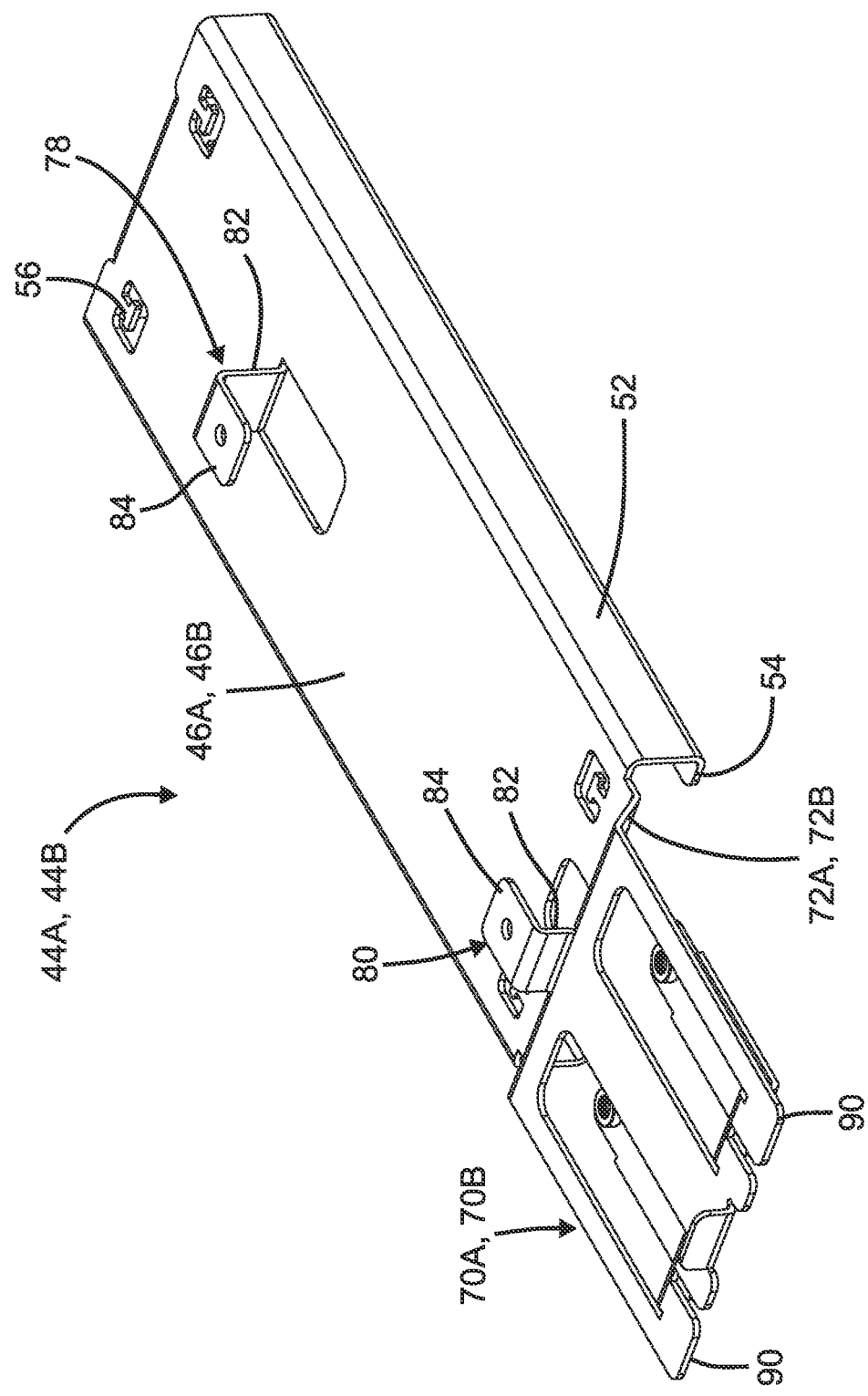
FIG. 10 is a bottom view of the bracket of FIG. 9.
Figure 11:
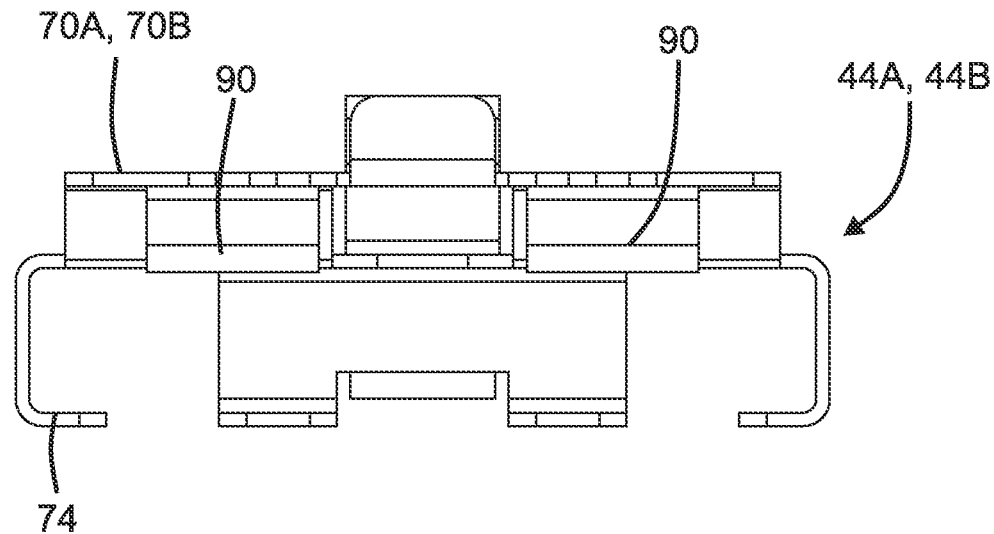
FIG. 11 is an end view of the bracket of FIG. 9.
Figure 12:
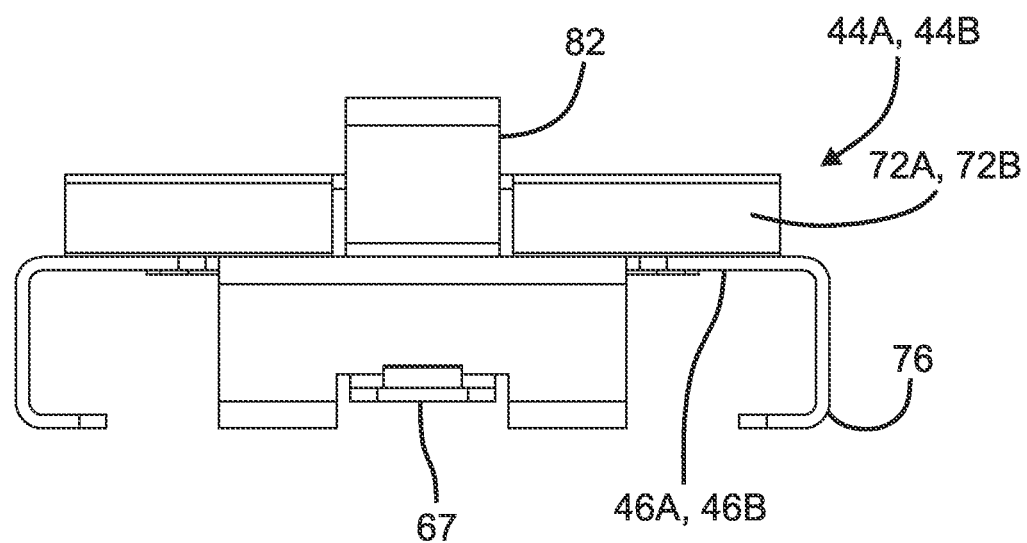
FIG. 12 is an opposite end view of the bracket of FIG. 9.

Referring to FIGS. 4-6, the enclosure 20 also includes an internal bracket arrangement 42 including first and second brackets 44A, 44B positioned within the interior of 39 of the housing 22. The first and second brackets 44A, 44B each have a length L2 that extends along the length L1 of the housing 22. The brackets 44A, 44B are positioned in end-to-end arrangement. Each of the brackets 44A, 44B also includes a width W that is transversely aligned with respect to the length L1 and that extends between the first and second sides 30, 32 of the housing 22. The first bracket 44A includes a first splice holder mounting platform 46A having a length L3 (see FIG. 9) that extends along a majority of the length L2 of the first bracket 44A. The first bracket 44A also includes a first cable anchoring location 48A positioned adjacent the first end 24 of the housing 22. The second bracket 44B includes a second splice holder mounting platform 46B having a length L3 that extends along a majority of the length L2 of the second bracket 44B. The second bracket 44B also includes a second cable anchoring location 48B positioned adjacent the second end 26 of the housing 22.

The enclosure 20 further includes a plurality of splice holder modules 50 each being selectively mountable at a plurality of different locations along the lengths L3 of the splice holder mounting platforms 46A, 46B. The ability to mount the splice holder modules at different locations along the lengths L3 of the splice holder mounting platforms 46A, 46B allows the system to better accommodate optical cables having optical fibers with different lengths. For longer optical fibers, the splice holder modules 50 can be mounted closer to a mid-region of the length L1 of the housing 22. In contrast, for shorter optical fibers, the splice holder modules can be mounted closer to the ends 24, 26 of the housing 22. In certain examples, the length L3 are at least 25 centimeters, or at least 30 centimeters to provide a relatively large length over which the splice holder modules 50 can be mounted. In certain examples, the splice holder modules 50 are secured to the splice holder mounting platforms 46A, 46B by adhesive. In certain examples, the splice holder modules 50 can each hold a plurality of splice sleeves each configured for reinforcing an optical splice. A typical fiber optic splice sleeve includes a reinforcing rod for reinforcing a splice location, and an adhesive filled heat shrinkable layer that is formed over the splice location with the reinforcing rod contained therein. In other examples, splice holder modules can be configured for holding mass fusion splices or other types of splices.

It will be appreciated that because the splice holder modules 50 are secured to the splice holder mounting platforms 46A, 46B by adhesive, the splice holder modules 50 can be positioned at an infinite number of different positions along the length L3 of each of the splice holder mounting platforms 46A, 46B. Further, the splice holder modules 50 can also be mounted at different locations across the width W of each of the splice holder mounting platforms 46A, 46B. In certain examples, it will further be appreciated that no specific pre-defined individual splice holder mounting locations are defined by the first and second splice holder mounting platforms 46A, 46B. Instead, the splice holder modules 50 can be mounted virtually anywhere on the splice holder mounting platforms 46A, 46B at the discretion of the installer based on the splicing conditions corresponding to a specific field splice.

Referring to FIGS. 9-14, the first and second brackets 44A, 44B each include a pair of sidewalls 52 that extend along the length L3 of the splice holder mounting platforms 46A, 46B. The sidewalls 52 are separated by the width W of the first and second brackets 44A, 44B and project upwardly from the first and second splice holder mounting platforms 46A, 46B. The first and second mounting brackets 44A, 44B further include lips 54 at upper ends of the sidewalls 52 that overhang the first and second splice holder mounting platforms 46A, 46B adjacent the sides 30, 32 of the housing 22.

Figure 13:
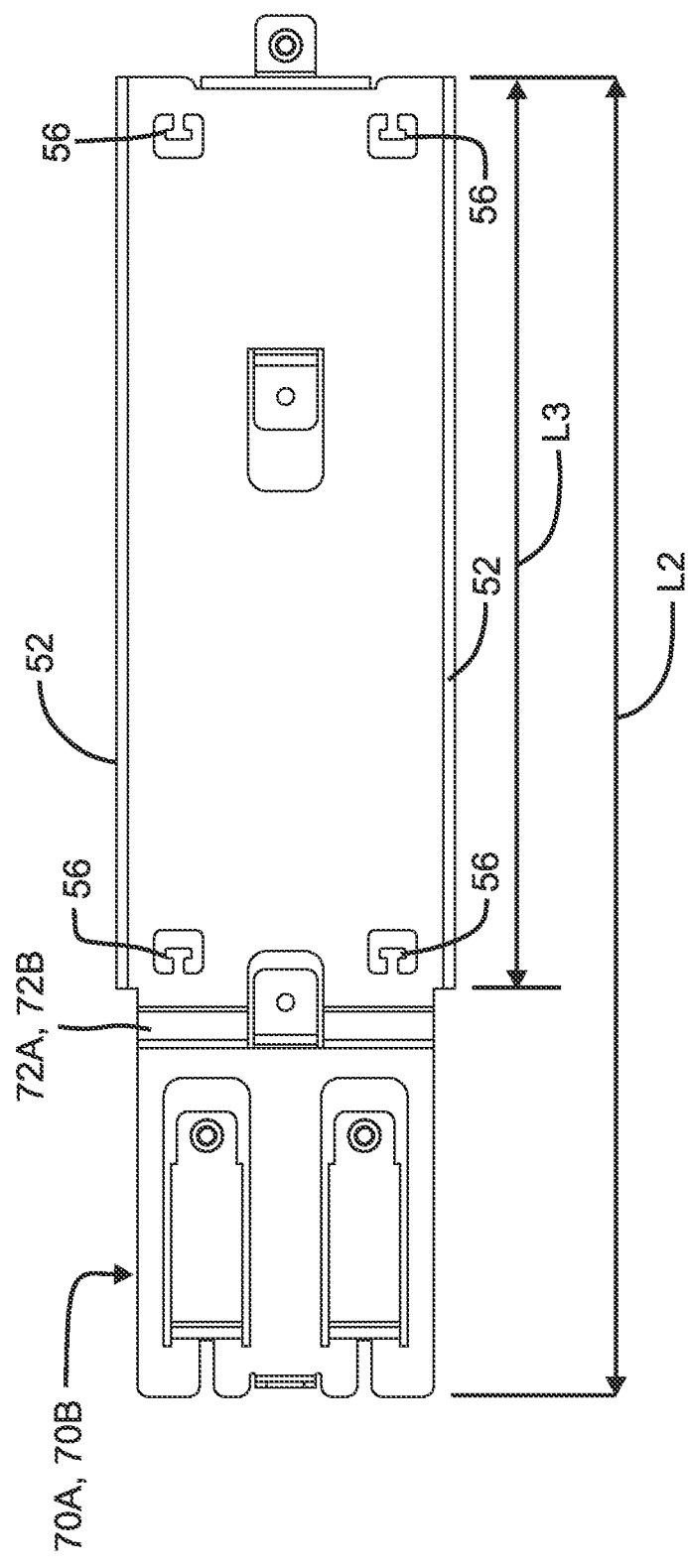
FIG. 13 is a top view of the bracket of FIG. 9.
Figure 14:
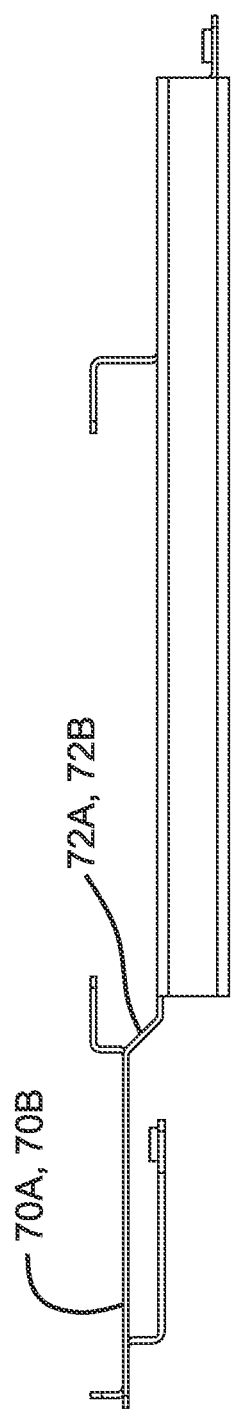
FIG. 14 is a side view the bracket of FIG. 9.

Referring to FIG. 13, each of the splice holder mounting platforms 46A, 46B includes integrated cable tie-down tabs 56 positioned at opposite ends of the length L3 of the first splice holder mounting platforms 46A, 46B. The cable tie-down tabs 56 are generally T-shaped and are configured for allowing cable or optical fiber to be secured to the platforms 46A, 46B by a cable tie or other type of structure. In the depicted example, the cable tie-down tabs 56 are unitarily formed with the platforms 46A, 46B and can be formed by a punching process.

In certain examples, the length L1 of the housing 22 is equal to or greater than 75 centimeters. In certain examples, the lengths L3 are equal to or greater than 25 centimeters, or equal to or greater than 30 centimeters.

Figure 7:
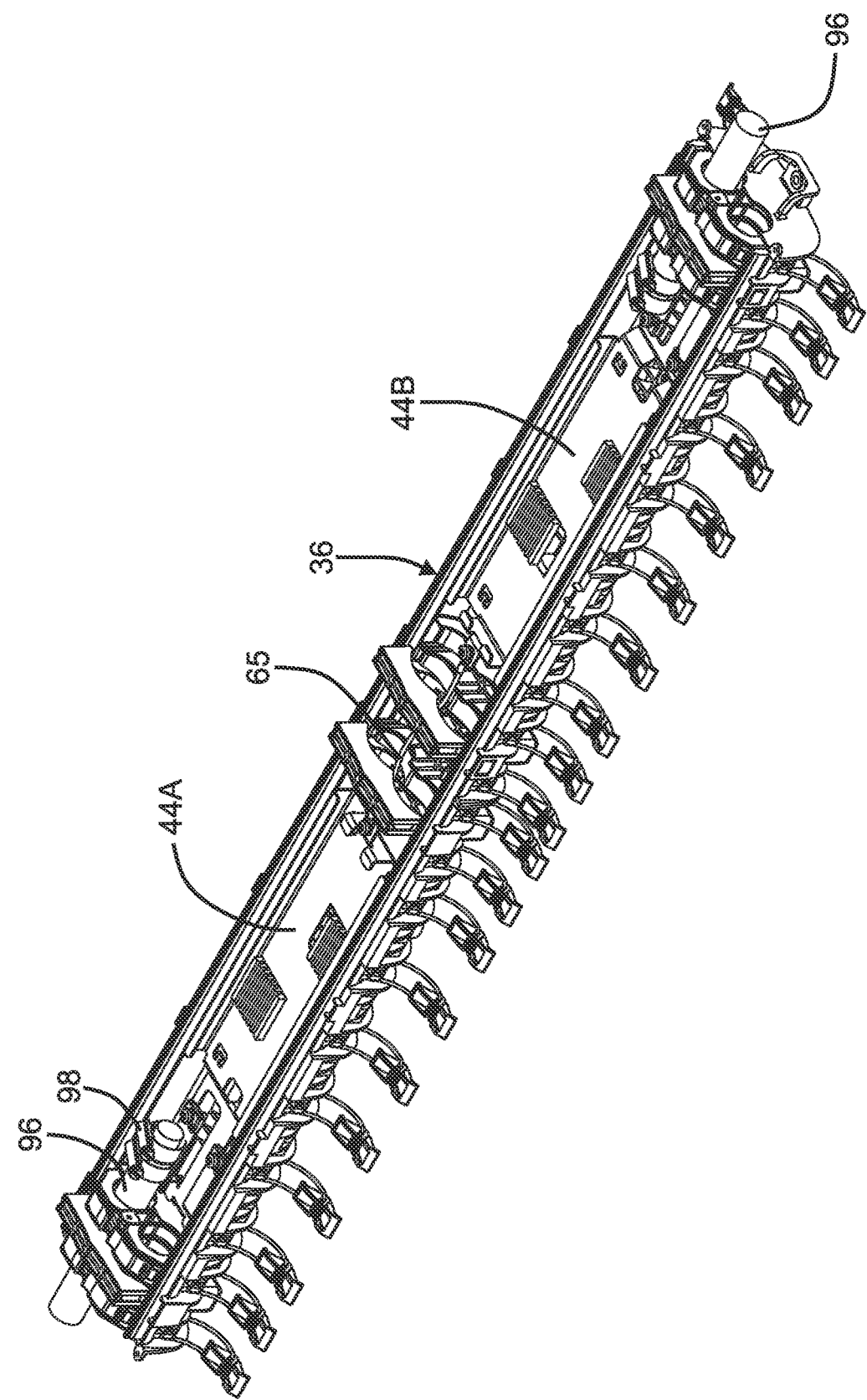
FIG. 7 is a perspective view of the telecommunication enclosure of FIG. 1 with fiber optic cables shown anchored at opposite ends of the enclosures.
Figure 7A:
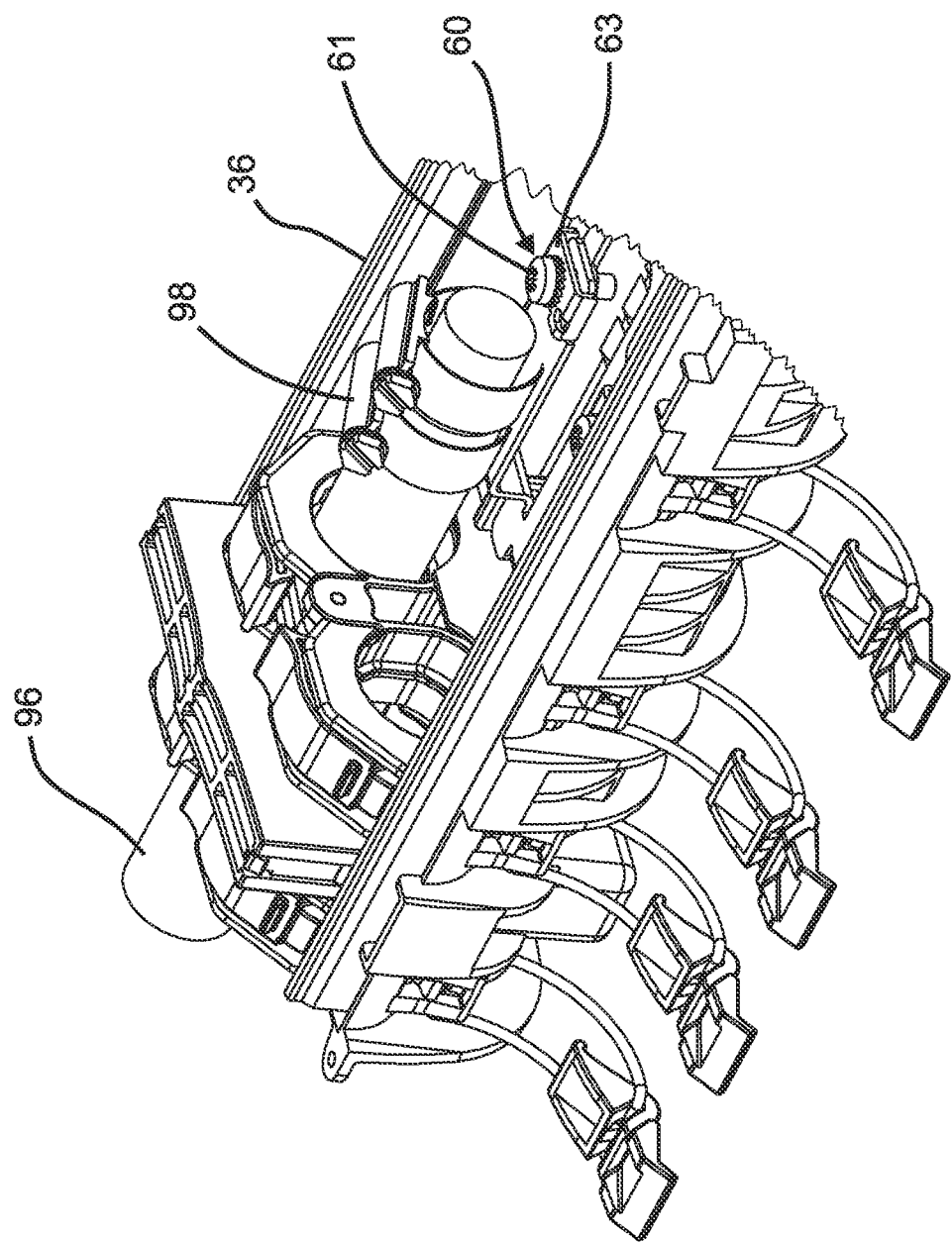
FIG. 7A is an enlarged view of a portion of FIG. 7.
Figure 8:
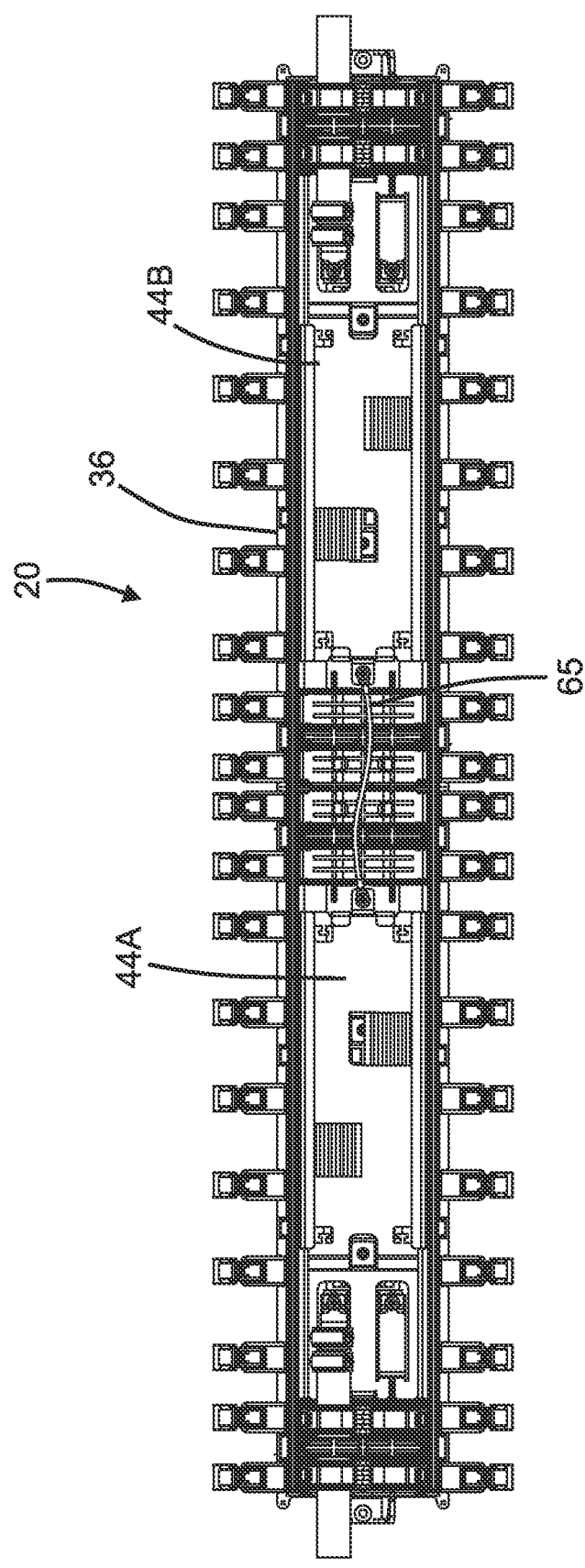
FIG. 8 is a top view showing the cable anchoring configuration of FIG. 7.

Referring to FIGS. 7 and 7A, the first and second cable anchoring locations 48A, 48B can include electrical ground connection locations 60 for electrically connecting cable shields or grounding cables to the first and second brackets 44A, 44B. It will be appreciated, that the brackets 44A, 44B are preferably constructed of a material that is electrically conductive such as a metal material. Therefore, the brackets 44A, 44B can be used to provide ground continuity through the length L1 of the housing 22 between cable sections routed through opposite ends 24, 26 of the housing 22. In certain examples, the electrical ground connection locations 60 can each include a fastener 61 such as a screw or bolt secured within an opening (e.g. a threaded opening) defined at the cable anchoring locations 48A, 48B. In certain examples, the electrical ground connection locations 60 can also include electrical contact plates 63 mounted on the fasteners 61.

For the brackets 44A, 44B to provide ground continuity through the length of the housing 22, it is preferred for the brackets 44A, 44B to be electrically connected together. For example, an electrical wire 65 (see FIG. 4) can be used to electrically connect the first and second brackets 44A, 44B together. The electrical wire 65 can traverse an axial gap defined between ends of the brackets 44A, 44B. In certain examples, the ends of the brackets 44A, 44B can include ground continuity tabs 67 for electrically connecting the electrical wires 65 to the brackets 44A, 44B. The ground continuity tabs 67 can define openings for receiving fasteners 68 (e.g. threaded fasteners threaded within threaded openings defined by the ground continuity tabs 67) which secure and electrically connect the electrical wires 65 to the brackets 44A, 44B.

Referring to FIGS. 9-14, the brackets 44A, 44B include lower platforms 70A, 70B connected to the splice holder mounting platforms 46A, 46B by angled steps 72A, 72B. The brackets 44A, 44B extend lengthwise between first and second ends 74, 76. The lower platforms 70A, 70B are located at the first ends 74 of the brackets 44A, 44B and the splice holder platforms 46A, 46B extend from the angled steps 72A, 72B to the second ends 76 of the brackets 44A, 44B. The brackets 44A, 44B each include first and second mounting tabs 78, 80 for fastening the mounting brackets 44A, 44B to the housing section 36 via fasteners such as screws or bolts. The mounting tabs 78, 80 each have angled configurations with stand-off portions 82 and attachment portions 84 that project outwardly from lower ends of the stand-off portions 82. The attachment portions 84 preferably define fastener opening for receiving fasteners such as screws used to secure the brackets 44A, 44B to the first housing section 34. The stand-off portions 82 of the first mounting tabs 78 project downwardly from the splice holder mounting platforms 46A, 46B and the stand-off portions 82 of the second mounting tabs 80 project downwardly from the lower platforms 70A, 70B.

The cable anchoring locations 48A, 48B of the brackets 44A, 44B are defined by cable anchoring tabs 90 having angled configurations with stand-off portions 92 that project upwardly from the lower platforms 70A, 70B and cable attachment portions 94 that project outwardly from upper ends of the stand-off portions 92. In certain examples, the cable attachment portions 94 provide locations where cables 96 (see FIGS. 7 and 7A) can be secured to the brackets 44A, 44B by fasteners such as hose clamps 98. In certain examples, the cable attachment portions 94 can define the openings 59 for receiving the fasteners 61 that define the electrical ground connection locations 60.

I claim:

1. A telecommunication enclosure comprising:
    an elongate housing having a length that extends from a first end to a second end, the first end second ends defining cable sealing ports for allowing cables to be routed into an interior of the housing, the housing including opposite first and second sides that extend along the length between the first and second ends, the housing including first and second housing sections that cooperate to enclose the interior of the housing, the first and second housing sections each extending from the first end to the second end of the housing, the first and second housing sections meeting at parallel seal locations at the first and second sides of the housing, the parallel seal locations extending along the length of the housing from the first end to the second end of the housing, the first and second housing sections being separable from one another to allow the interior of the housing to be accessed;
    first and second brackets secured within the interior of the housing, the first and second brackets having lengths that extend along the length of the housing and widths that extend between the first and second sides of the housing, the first bracket including a first splice holder mounting platform that extends along a majority of the length of the first bracket and a first cable anchoring location positioned adjacent the first end of the housing, the second bracket including a second splice holder mounting platform that extends along a majority of the length of the second bracket and a second cable anchoring location positioned adjacent the second end of the housing; and
    a plurality of splice holder modules each being selectively mountable at a plurality of different locations along the lengths of the first and second splice holder mounting platforms.

2. The telecommunication enclosure of claim 1, wherein no pre-defined splice holder mounting locations are defined by the first and second splice holder mounting platforms.

3. The telecommunication enclosure of claim 1, wherein the splice holder modules are affixed to the first and second splice holder mounting platforms by adhesive.

4. The telecommunication enclosure of claim 1, wherein the first and second brackets include side walls that extend along the lengths of the first and second splice holder mounting platforms, the side walls being separated by the widths of the first and second brackets and projecting upwardly from the first and second splice holder mounting platforms, the first and second brackets further including lips at upper ends of the side walls that overhang the first and second splice holder mounting platforms.

5. The telecommunication enclosure of claim 1, wherein the first and second splice holder mounting platforms include integrated cable tie-down tabs positioned at opposite ends of the lengths of the first and second splice holder mounting platforms.

6. The telecommunication enclosure of claim 1, wherein the first and second cable anchoring locations include electrical ground connection location for electrically connecting cable shields or grounding cables to the first and second brackets.

7. The telecommunication enclosure of claim 1, further comprising an electrical wire that electrically connects the first and second brackets together to provide ground continuity through the telecommunication enclosure.

8. The telecommunication enclosure of claim 7, wherein the electrical wire is electrically connected to the first and second brackets via fasteners mounted at ground continuity tabs provided at opposing ends of the first and second brackets.

9. The telecommunication enclosure of claim 8, wherein the first and second brackets are separated by a gap, and the electrical wire traverses the gap.

10. The telecommunication enclosure of claim 1, wherein the first bracket includes a first lower platform connected to the first splice holder mounting platform by a first angled step and wherein the second bracket includes a second lower platform connected to the second splice holder mounting platform by a second angled step, wherein the lengths of the first and second brackets extend between first and second ends of the first and second brackets, wherein the lower platforms are located at the first ends of the brackets and the splice holder mounting platforms extend from the angled steps to the second ends of the brackets.

11. The telecommunication enclosure of claim 10, wherein the brackets each include first and second mounting tabs for fastening the brackets to the first housing section via fasteners, the mounting tabs having angled configurations with stand-off portions and attachment portions that project outwardly from lower ends of the stand-off portions, the attachment portions defining fastener openings, the stand-off portions of the first mounting tabs projecting downwardly from the splice holder mounting platforms and the stand-off portions of the second mounting tabs projecting downwardly from the lower platforms.

12. The telecommunication enclosure of claim 11, wherein the cable anchoring locations are defined by cable anchoring tabs having angled configurations with stand-off portions that projects upwardly from the lower platforms and cable attachment portions that project outwardly from upper ends of the stand-off portions.

13. The telecommunication enclosure of claim 12, wherein the cable attachment portions define fastener openings for receiving grounding fasteners used to electrically connect cable shields or grounding cables to the brackets.

14. The telecommunication enclosure of claim 13, further comprising hose clamps for securing cables to the cable attachment portions.

15. The telecommunication enclosure of claim 1, wherein the length of the housing extends at least 75 centimeters.

16. The telecommunication enclosure of claim 1, wherein the lengths of the splice holder mounting platforms each extend at least 25 centimeters.

17. The telecommunication enclosure of claim 1, wherein the splice holder modules are configured to be mounted at different locations across a width of at least one of the first and second splice holder mounting platforms.

18. The telecommunication enclosure of claim 1, wherein a width of at least one of the splice holder modules is about half of a width of at least one of the first and second splice holder mounting platforms.

19. The telecommunication enclosure of claim 1, wherein the splice holder modules are configured to be mounted closer to a mid-region of the length of the housing than to the first and second ends of the housing.

20. The telecommunication enclosure of claim 1, wherein the plurality of splice holder modules at least includes a first splice holder module mounted on the first splice holder mounting platform and a second splice holder module mounted on the second splice holder mounting platform, and wherein the first and second splice holder modules are mounted at same location across a width of the housing.

21. The telecommunication enclosure of claim 20, wherein the plurality of splice holder modules further includes a third splice holder module mounted on the first splice holder mounting platform and a fourth splice holder module mounted on the second splice holder mounting platform, wherein the third and fourth splice holder modules are mounted at same location across the width of the housing, and wherein the first and third splice holder modules are mounted at different locations across the width of the of the housing.

22. The telecommunication enclosure of claim 1, wherein the first and second brackets are axially secured apart within the interior of the housing, and an axial gap having a length that extend along the length of the housing is arranged between the first and second brackets.

23. The telecommunication enclosure of claim 22, wherein the axial gap is placed closer to a mid-region of the length of the housing than to the first and second ends of the housing.

24. The telecommunication enclosure of claim 22, wherein a length of the axial gap is less than the length of at least one of the first and second brackets.

25. The telecommunication enclosure of claim 1, wherein each of the splice holder modules is configured to hold a plurality of splice sleeves each configured for reinforcing an optical splice.

26. The telecommunication enclosure of claim 25, wherein each of the splice sleeves includes a reinforcing rod and an adhesive filled heat shrinkable.

27. The telecommunication enclosure of claim 1, wherein the housing includes a midpoint positioned between the first end and the second end of the housing; wherein a first end of the first splice holder mounting platform is closer to the first end of the housing and a second end of the first splice holder mounting platform is closer to the midpoint of the housing; and wherein a first end of the second splice holder mounting platform is closer to the second end of the housing and a second end of the second splice holder mounting platform is closer to the midpoint of the housing.

* * * * *